United States Patent
Kakkar et al.

(10) Patent No.: US 11,003,051 B2
(45) Date of Patent: May 11, 2021

(54) UNIFORM, EFFICIENT, AND COLOR TUNABLE RING FLASH FOR CAMERA USING LEDS WITH LIGHT EMISSION FROM MULTIPLE SIDES

(71) Applicant: Lumileds Holding B.V., Schiphol (NL)

(72) Inventors: Varun Dev Kakkar, Eindhoven (NL); Arjen Van Der Sijde, Eindhoven (NL); Erno Fancsali, Eindhoven (NL); Chunxia Feng, Shanghai (CN); Nicola Pfeffer, Eindhoven (NL)

(73) Assignee: Lumileds Holding B.V., Schipol (NL)

( * ) Notice: Subject to any disclaimer, the term of this patent is extended or adjusted under 35 U.S.C. 154(b) by 0 days.

(21) Appl. No.: 16/071,784

(22) PCT Filed: Jan. 16, 2017

(86) PCT No.: PCT/EP2017/050770
§ 371 (c)(1),
(2) Date: Jul. 20, 2018

(87) PCT Pub. No.: WO2017/125337
PCT Pub. Date: Jul. 27, 2017

(65) Prior Publication Data
US 2019/0033688 A1    Jan. 31, 2019

(30) Foreign Application Priority Data

Jan. 21, 2016  (WO) ............... PCT/CN2016/071584
Feb. 23, 2016  (EP) ..................................... 16156952

(51) Int. Cl.
*G03B 15/05*    (2006.01)
*F21V 8/00*     (2006.01)
*H04N 5/225*    (2006.01)

(52) U.S. Cl.
CPC ............ *G03B 15/05* (2013.01); *G02B 6/003* (2013.01); *G02B 6/0018* (2013.01);
(Continued)

(58) Field of Classification Search
CPC ............ G03B 15/05; G03B 2215/0539; G03B 2215/0575; G03B 2215/0567;
(Continued)

(56) References Cited

U.S. PATENT DOCUMENTS

2006/0039692 A1    2/2006  Lee et al.
2006/0209524 A1    9/2006  Tenmyo
(Continued)

FOREIGN PATENT DOCUMENTS

EP    14741012.0 A1    11/2015
WO    2008/152610 A2   12/2008
(Continued)

OTHER PUBLICATIONS

"International Application Serial No. PCT/EP2017/050770, International Preliminary Report on Patentability dated Aug. 2, 2018", 8 pgs.
"International Application Serial No. PCT/EP2017/050770, International Search Report dated Mar. 31, 2017", 4 pgs.
"International Application Serial No. PCT/EP2017/050770, Written Opinion dated Mar. 31, 2017", 6 pgs.

*Primary Examiner* — Kevin Quarterman
(74) *Attorney, Agent, or Firm* — Schwegman Lundberg & Woessner, P.A.

(57) ABSTRACT

A device includes a light-emitting device (LED) having at least two vertical light-emitting sides, and a ring-shaped light guide having a bottom side, a top side comprising a light-emitting surface, an inner sidewall, and an outer sidewall defining an indentation having at least two vertical in-coupling surfaces mated to the at least two vertical light-emitting sides of the LED.

21 Claims, 4 Drawing Sheets

(52) U.S. Cl.
CPC ......... *G02B 6/0038* (2013.01); *G02B 6/0073* (2013.01); *H04N 5/2256* (2013.01); *G03B 2215/0539* (2013.01); *G03B 2215/0567* (2013.01); *G03B 2215/0575* (2013.01); *G03B 2215/0582* (2013.01); *G03B 2215/0589* (2013.01)

(58) Field of Classification Search
CPC .... G03B 2215/0589; G03B 2215/0582; G02B 6/0038; G02B 6/0018; G02B 6/0073; G02B 6/003; H04N 5/2256
See application file for complete search history.

(56) References Cited

U.S. PATENT DOCUMENTS

| | | | |
|---|---|---|---|
| 2007/0159846 A1* | 7/2007 | Nishiyama | G01D 11/28 |
| | | | 362/602 |
| 2011/0123184 A1 | 5/2011 | Mather et al. | |
| 2012/0321290 A1 | 12/2012 | Daijo | |
| 2014/0209796 A1* | 7/2014 | Ishii | G03B 15/05 |
| | | | 250/227.11 |
| 2014/0211446 A1 | 7/2014 | Tenmyo et al. | |

FOREIGN PATENT DOCUMENTS

| | | |
|---|---|---|
| WO | 2012/042436 A1 | 4/2012 |
| WO | WO-2017125337 A1 | 7/2017 |

\* cited by examiner

UNIFORM, EFFICIENT, AND COLOR TUNABLE RING FLASH FOR CAMERA USING LEDS WITH LIGHT EMISSION FROM MULTIPLE SIDES

FIELD OF THE INVENTION

The present disclosure relates to a light-emitting diodes or devices (LEDs) powered light guide, and more particular to an LED powered ring flash for a camera.

BACKGROUND

A camera flash helps a camera to capture a good quality picture in low light scenes. A camera flash located on one side of a camera lens is likely to create shadows on a subject, especially for a macrophotography when the subject is very close to the lens. A ring flash is a circular photographic flash that fits around the lens for use in macrophotography. The ring flash provides uniform illumination with few shadows visible in the photograph, as the origin of the light is very close to and surrounds the optical axis of the lens.

SUMMARY

In one or more examples of the present disclosure, a device includes a light-emitting diode or device (LED) having at least two vertical light-emitting sides, and a ring-shaped light guide having a bottom side, a top side comprising a light-emitting surface, an inner sidewall, and an outer sidewall defining an indentation having at least two vertical in-coupling surfaces mated to the at least two vertical light-emitting sides of the LED.

BRIEF DESCRIPTION OF THE DRAWINGS

In the drawings.

Use of the same reference numbers in different figures indicates similar or identical elements.

DETAILED DESCRIPTION

A mobile device, such as a camera phone, may include a ring flash. The ring flash may operate continuously in a flashlight mode or during the recording of a video.

A ring flash may use individual light-emitting diodes or devices (LEDs) with simple transmission optics as its light source. The LEDs generate hot spots so the light-emitting surface does not provide uniform illumination, especially in camera phone applications when the ring flash is small or operates continuously.

Figure 1:
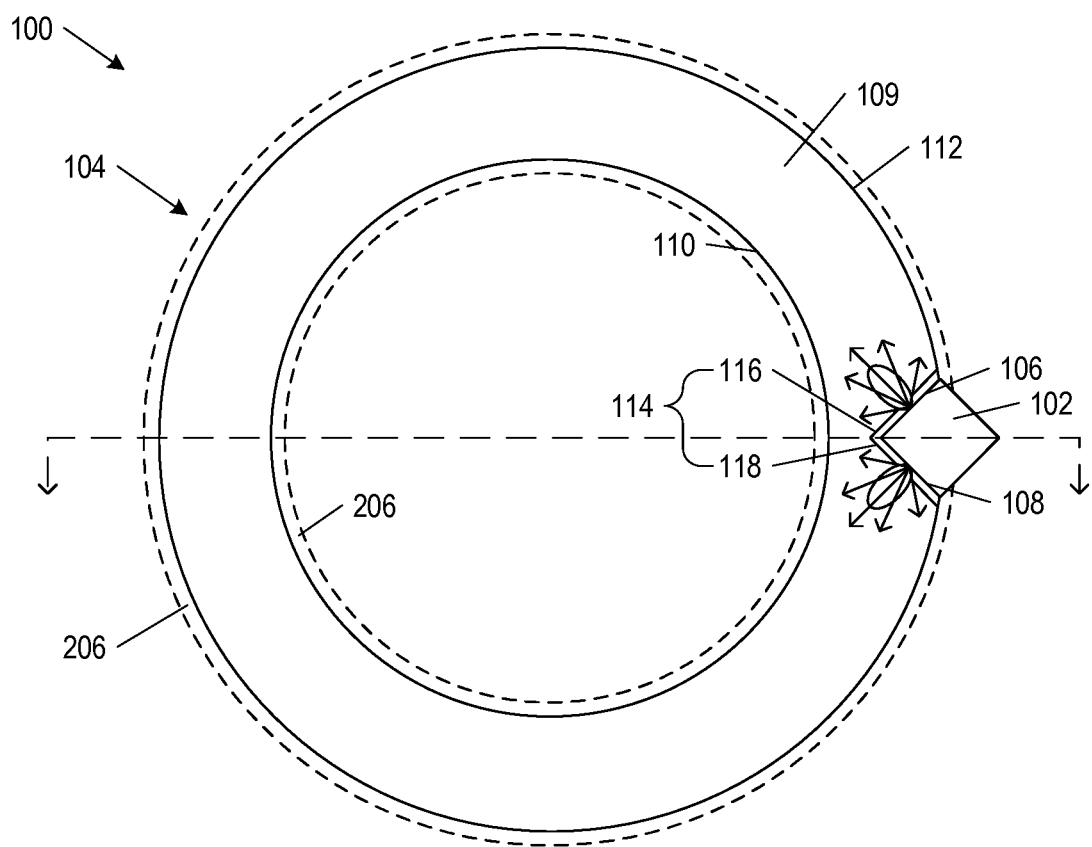
FIG. 1 shows a top view of a light guide module in examples of the present disclosure.
Figure 2:
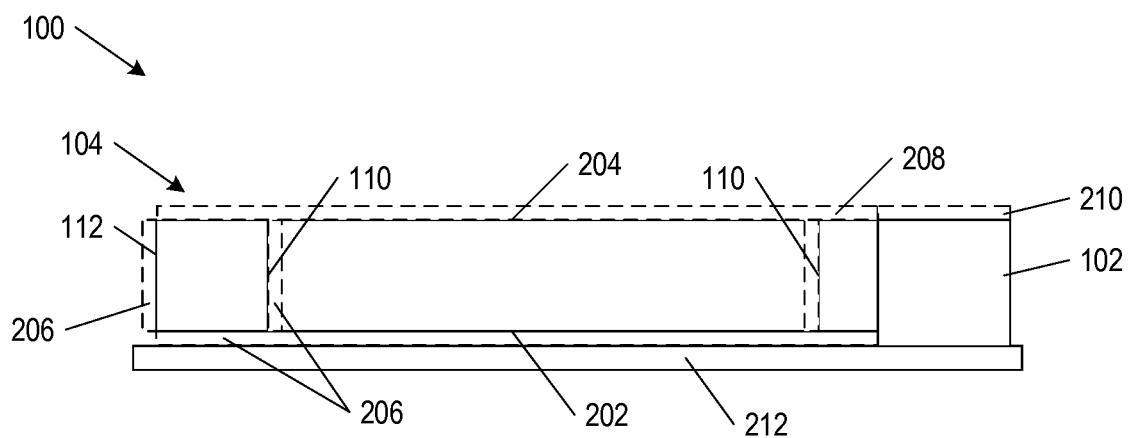
FIG. 2 shows a cross-sectional view of the light guide module of FIG. 1 in examples of the present disclosure.

FIGS. 1 and 2 show top and cross-section views of a light guide module 100 in examples of the present disclosure. Light guide module 100 includes a light-emitting diode or device (LED) 102 and a ring-shaped light guide 104. LED 102 has two vertical light-emitting sides 106 and 108. LED 102 may have the shape of a rectangular cuboid.

Light guide 104 has a body 109 with a circular inner sidewall 110, a circular outer sidewall 112, an annular bottom side 202 (FIG. 2), and an annular top side 204 (FIG. 2). Top side 204 is a light-emitting surface. Outer sidewall 112 defines an opening or indentation 114 having two vertical in-coupling surfaces 116 and 118, which are mated to respective light-emitting sides 106 and 108 of LED 102. Light guide body 109 may be made by injection molding using material such as polymethyl methacrylate (PMMA).

From in-coupling surfaces 116 and 118, light travels around light guide body 109 by total internal reflection (TIR). Light guide 104 may include a reflector film 206 fixed on inner wall 110, outer wall 112, and bottom side 202 to help light travel around light guide body 109. Light guide 104 may include a diffuser or collimating film 208 fixed on top side 204 to achieve a uniform and vectored or collimated emission.

A white ink pattern 210 (FIG. 2) may be printed on a top side of LED 102 to hide the LED from view.

Light guide module 100 may further include a printed circuit board (PCB) 212 (FIG. 2). LED 102 and light guide 104 are mounted on PCB 212. PCB 212 has pads for mounting LED 102 and traces coupling the pads to other components on or off the board. PCB 212 also mechanically supports LED 102 and light guide 104.

Figure 3:
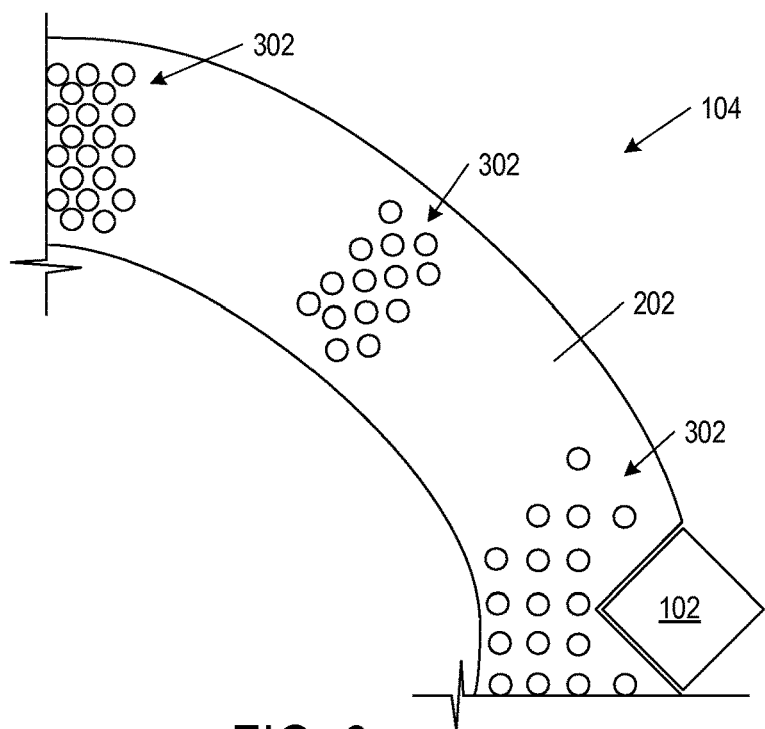
FIG. 3 shows a bottom view of a portion of the light guide of FIGS. 1 and 2 in examples of the present disclosure.

FIG. 3 shows a bottom view of a portion of light guide 104 in examples of the present disclosure. Light guide 104 includes white ink dots 302 printed on bottom side 202 in order to extract light from the light guide through top side 204 (FIG. 2). The density of ink dots 302 increases as they move away from LED 102 to ensure uniform illumination over the entire top side 204. Instead of white ink dots, bottom side 202 may be textured by molding or machining to create protrusions or indentations 302 in order to extract light from light guide 104 through top side 204. This may be enhanced by adding a reflector film 206 that conforms to bottom side 202, especially the contour of features 302. For example, reflector film 206 may be deposited or laminated to bottom side 202.

Figure 4:
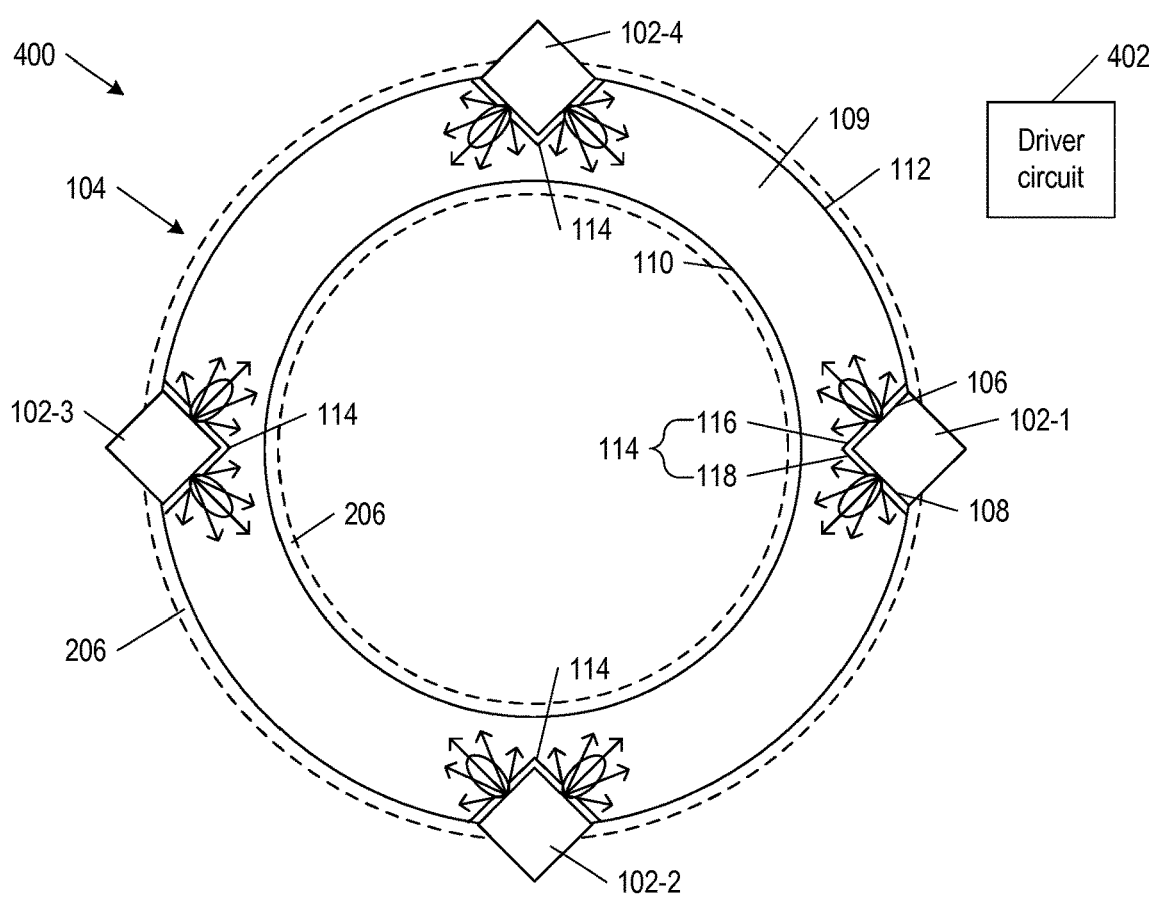
FIG. 4 shows a top view of another light guide module in examples of the present disclosure.

FIG. 4 shows a top view of a light guide module 400 in examples of the present disclosure. Light guide module 400 is similar to light guide module 100 except it includes multiple LEDs, such as LEDs 102-1, 102-2, 102-3, and 102-4 (collectively as "LEDs 102"), and outer sidewall 112 of light guide body 109 now defines multiple openings or indentations 114 to receive the LEDs. LEDs 102 may have different wavelengths so a driver circuit 402 may drive them in different combinations or at different settings (e.g., current frequencies or magnitudes) to create a desired color (e.g., a white color point). Alternatively, driver circuit 402 may selectively (e.g., sequentially) drive LEDs 102 to create an animated effect. Driver circuit 402 may be a component mounted on PCB 212 (FIG. 2) and connected by traces to LEDs 102.

Figure 5:
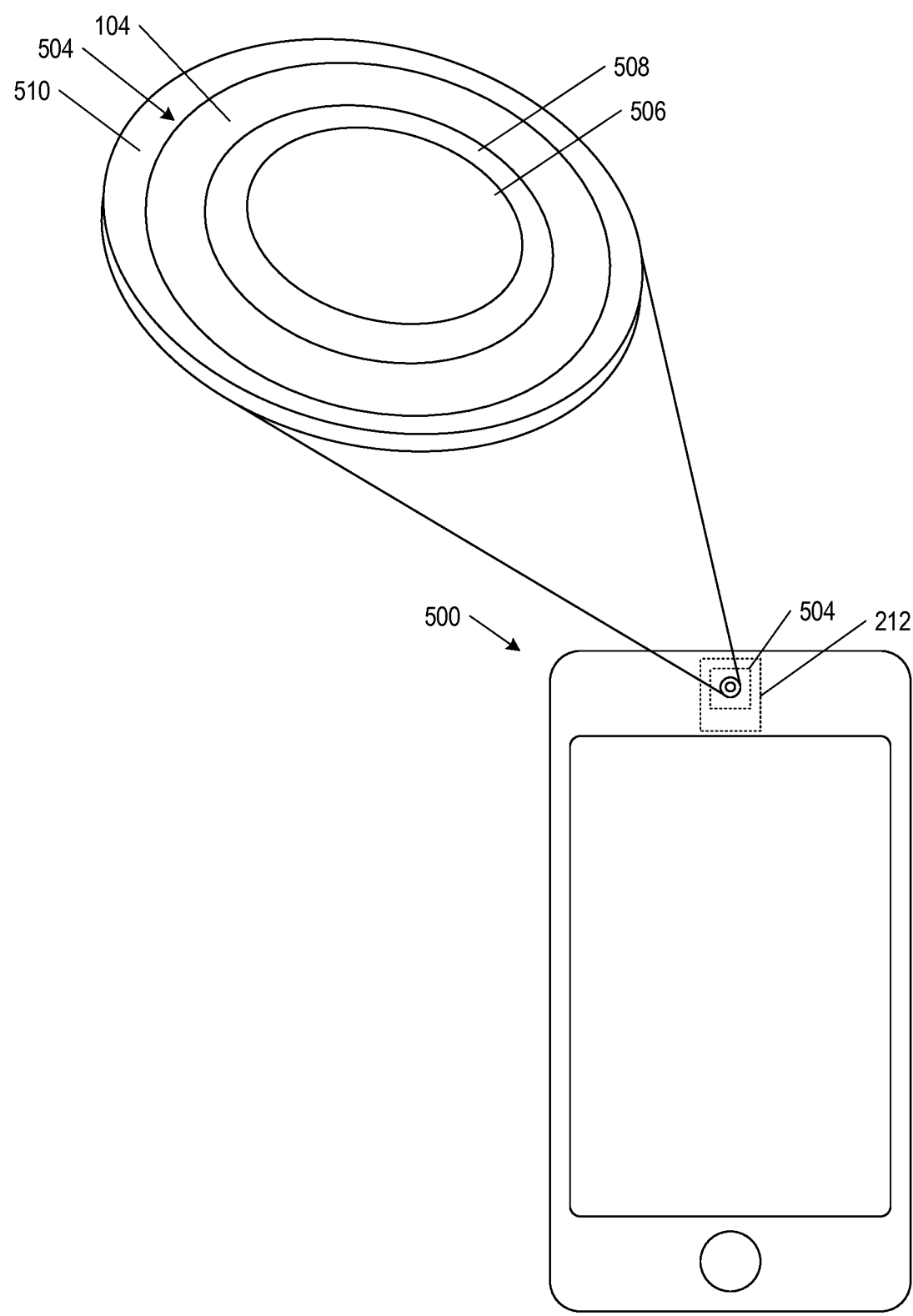
FIG. 5 shows a device fitted with the light guide module of FIG. 1 or 4 in examples of the present disclosure.

FIG. 5 shows a device 500 fitted with a light guide module 502 in examples of the present disclosure. Light guide module 502 may be light guide module 100 or 400. Device 500 may be a camera phone with a camera module 504 having a lens 506 in examples of the present disclosure. Ring-shaped light guide 104 is fitted around lens 506 or a bezel 508 of the lens. Device 500 may include a bezel 510 around ring-shaped light guide 104 of light guide module 502.

Figure 6:
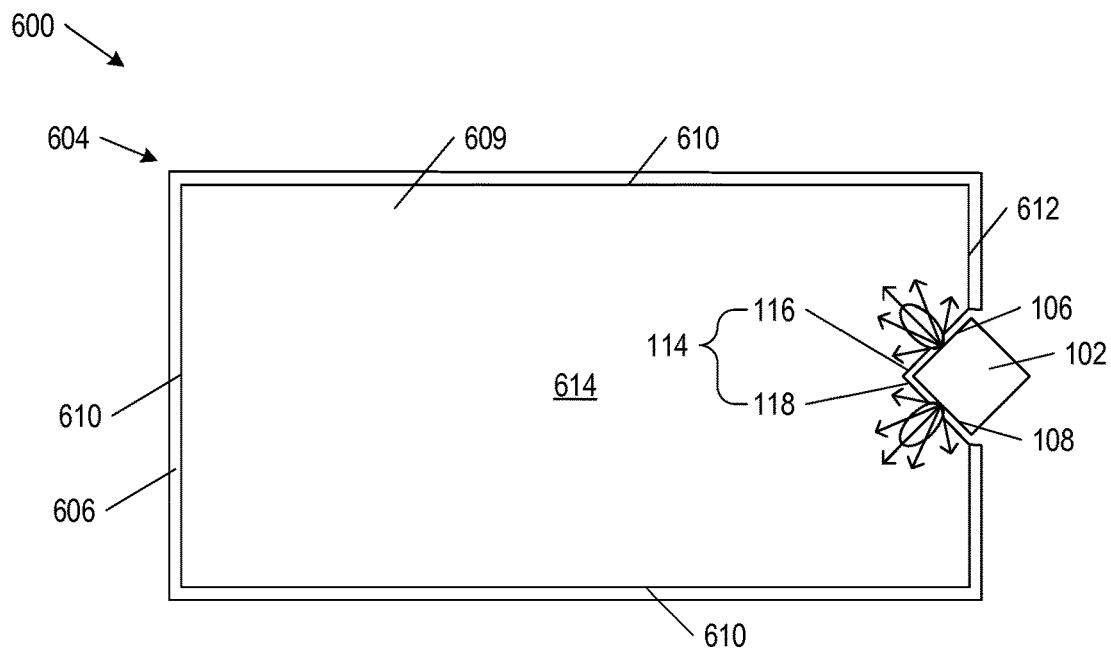
FIG. 6 shows a light guide module in examples of the present disclosure.

Although a ring-shaped light guide 104 has been described, the principles of the present disclosure may be applied to light guides of other shapes. FIG. 6 shows a light guide module 600 in examples of the present disclosure. Light guide module 600 is similar to light guide module 100 and 400 except it has a rectangular light guide 604. Light guide 604 has a body 609 that is a rectangular cuboid with sidewalls 610, a sidewall 612, a bottom side (not visible), and a top side 614. Top side 614 is a light-emitting surface. Sidewall 612 defines an opening or indentation 114 having two vertical in-coupling surfaces 116 and 118, which are mated to respective light-emitting sides 106 and 108 of LED 102. Light guide 604 may include reflector film 206 fixed on sidewalls 610, sidewall 612, and the bottom side (not visible). Light guide 604 may include a diffuser or collimating film (not shown) fixed on top side 614.

Figure 7:
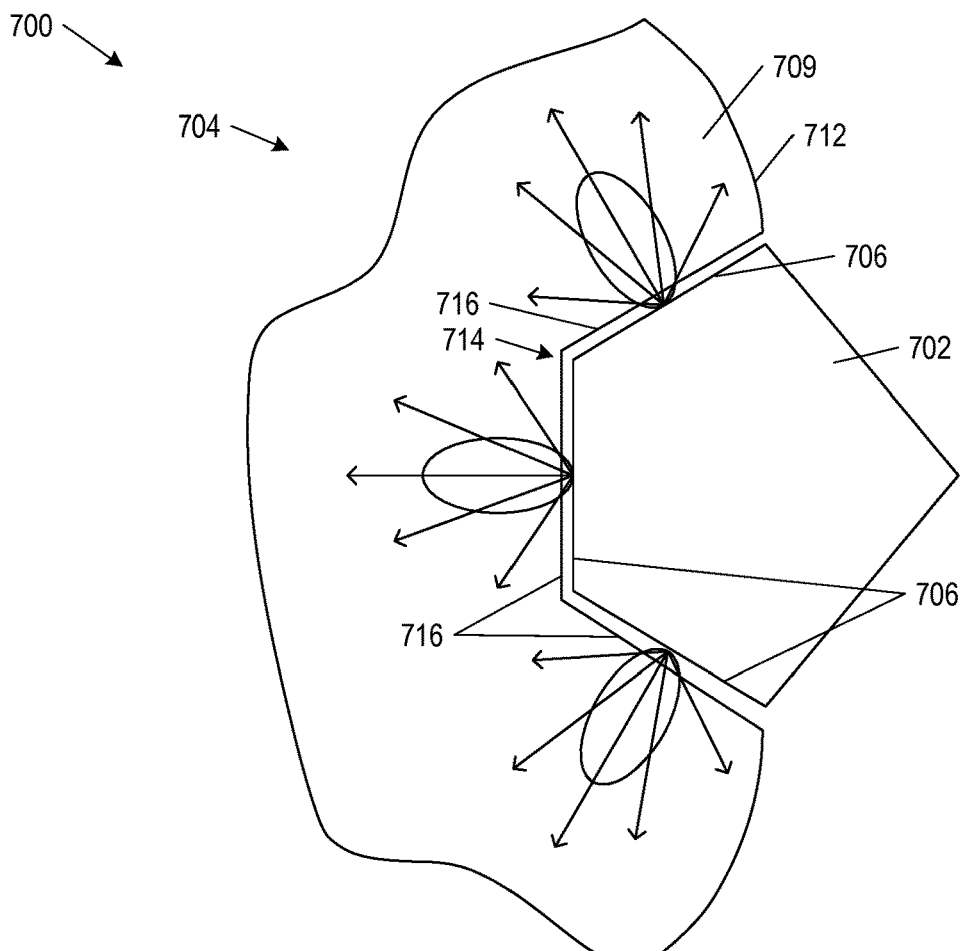
FIG. 7 shows a partial top view of a light guide module in examples of the present disclosure.

Although a rectangular cuboid LED 102 with two vertical light-emitting sides 106 and 108 has been described, the principles of the present disclosure may be applied to LEDs off other shapes having more than two vertical light-emitting sides. FIG. 7 shows a partial top view of a light guide module 700 in examples of the present disclosure. Light guide module 700 is similar to light guide module 100, 400, and 700 except it has an LED 702 with three vertical light-emitting sides 706. A light guide 704 has a body 709 with a sidewall 712 defines an opening or indentation 714 having three vertical in-coupling surfaces 716, which are mated to respective light-emitting sides 706 of LED 702.

Various other adaptations and combinations of features of the embodiments disclosed are within the scope of the invention. Numerous embodiments are encompassed by the following claims.

The invention claimed is:

1. A light guide module, comprising:
a light guide configured to guide light in a ring as guided light, the ring defining a plane,
the light guide including a light-emitting surface that is generally planar, substantially parallel to the plane, and configured to emit at least a portion of the guided light,
the light guide further including a first light-accepting surface that is generally planar and positioned generally orthogonal to the light-emitting surface,
the light guide further including a second light-accepting surface that is generally planar and positioned generally orthogonal to the light-emitting surface, the second light-accepting surface being adjacent to the first light-accepting surface and angled with respect to the first light-accepting surface; and
a light-emitting diode configured to illuminate the light guide,
the light-emitting diode having a first light-producing surface that is generally planar and positioned to face the first light-accepting surface of the light guide,
the light-emitting diode having a second light-producing surface that is generally planar and positioned to face the second light-accepting surface of the light guide.

2. The light guide module of claim 1, further comprising a light guide bezel surrounding the light guide.

3. The light guide module of claim 1, further comprising a printed circuit board electrically coupled to the light-emitting diode, wherein the light-emitting diode and the light guide are mounted on the printed circuit board.

4. The light guide module of claim 1, wherein the light guide further includes an opposing surface positioned opposite the light-emitting surface, the opposing surface being textured, the texturing configured to enhance emission of the guided light through the light-emitting surface.

5. The light guide module of claim 1, wherein the light guide further includes an opposing surface positioned opposite the light-emitting surface, the opposing surface comprising dots that are configured to enhance emission of the guided light through the light-emitting surface.

6. The light guide module of claim 1, wherein the light guide is shaped to guide the light via total internal reflection.

7. The light guide module of claim 1, further comprising a reflector film positioned on the light guide away from the light-emitting surface.

8. The light guide module of claim 1, further comprising a diffuser film positioned on the light-emitting surface.

9. The light guide module of claim 1, further comprising a pattern positioned on the light-emitting diode on a side of the light-emitting diode that faces the light-emitting surface of the light guide, the pattern configured to obscure the light-emitting diode.

10. The light guide module of claim 1,
wherein the light guide further includes a third light-accepting surface that is generally planar and positioned generally orthogonal to the light-emitting surface;
wherein the light guide further includes a fourth light-accepting surface that is generally planar and positioned generally orthogonal to the light-emitting surface, the fourth light-accepting surface being adjacent to the third light-accepting surface and angled with respect to the third light-accepting surface; and
further comprising a second light-emitting diode configured to illuminate the light guide,
the second light-emitting diode having a third light-producing surface that is generally planar and positioned to face the third light-accepting surface of the light guide,
the second light-emitting diode having a fourth light-producing surface that is generally planar and positioned to face the fourth light-accepting surface of the light guide.

11. The light guide module of claim 10, wherein the light-emitting diode and the second light-emitting diode are configured to emit light in the visible part of the electromagnetic spectrum.

12. The light guide module of claim 11, wherein the light-emitting diode and the second light-emitting diode are configured to emit light having different wavelengths, and further comprising a driver being configured to:
drive the first light-emitting diode and the second light-emitting diode at different settings to tune a white color point for a mixture of light produced by the first light-emitting diode and the second light-emitting diode.

13. The light guide module of claim 1, further comprising a lens positioned such that the light guide surrounds the lens.

14. The light guide module of claim 1, wherein:
the first light-producing surface of the light-emitting diode is positioned directly adjacent to the first light-accepting surface of the light guide, such that there are no intervening optical elements between the first light-producing surface of the light-emitting diode and the first light-accepting surface of the light guide; and
the second light-producing surface of the light-emitting diode is positioned directly adjacent to the second light-accepting surface of the light guide, such that there are no intervening optical elements between the second light-producing surface of the light-emitting diode and the second light-accepting surface of the light guide.

15. The light guide module of claim 1, wherein:
the first light-producing surface of the light-emitting diode is generally parallel to the first light-accepting surface of the light guide; and
the second light-producing surface of the light-emitting diode is generally parallel to the second light-accepting surface of the light guide.

16. The light guide module of claim 1, wherein the light guide has a cross-section that is generally rectangular, the cross-section being taken in a plane that passes through a center of the light guide and is substantially orthogonal to the light-emitting surface.

17. The light guide module of claim 16, wherein:
the light-emitting diode is shaped as a rectangular cuboid;
the first light-producing surface of the light-emitting diode is substantially orthogonal to the second light-producing surface of the light-emitting diode; and
the first light-accepting surface of the light guide is substantially orthogonal to the second light-accepting surface of the light guide.

18. The light guide module of claim 1, wherein:
the light guide further includes a third light-accepting surface that is generally planar and positioned generally orthogonal to the light-emitting surface, the third light-accepting surface being adjacent to the second light-accepting surface and angled with respect to the second light-accepting surface; and
the light-emitting diode has a third light-producing surface that is generally planar and positioned to face the third light-accepting surface of the light guide.

19. The light guide module of claim 18, wherein:
the third light-producing surface of the light-emitting diode is positioned directly adjacent to the third light-accepting surface of the light guide, such that there are no intervening optical elements between the third light-producing surface of the light-emitting diode and the third light-accepting surface of the light guide; and
the third light-producing surface of the light-emitting diode is generally parallel to the third light-accepting surface of the light guide.

20. The light guide module of claim 1, wherein the first light-accepting surface and the second light-accepting surface extend from an outer diameter of the light guide and extend only partially toward an inner diameter of the light guide.

21. A method for producing a light guide module, the method comprising:
forming a light guide,
the light guide configured to guide light in a ring as guided light,
the ring defining a plane,
the light guide including a light-emitting surface that is generally planar, substantially parallel to the plane, and configured to emit at least a portion of the guided light,
the light guide further including a first light-accepting surface that is generally planar and positioned generally orthogonal to the light-emitting surface,
the light guide further including a second light-accepting surface that is generally planar and positioned generally orthogonal to the light-emitting surface, the second light-accepting surface being adjacent to the first light-accepting surface and angled with respect to the first light-accepting surface.

* * * * *